May 19, 1970  A. R. SLIETER  3,512,661
SILO UNLOADER SUSPENSION

Filed June 6, 1968

Allan R. Slieter
INVENTOR.

BY Clarence A. O'Brien
and Harvey B. Jacobson
Attorneys

May 19, 1970 A. R. SLIETER 3,512,661
SILO UNLOADER SUSPENSION
Filed June 6, 1968 4 Sheets-Sheet 2

Allan R. Slieter
INVENTOR.

BY Clarence A O'Brien
and Harvey B. Jackson
Attorneys

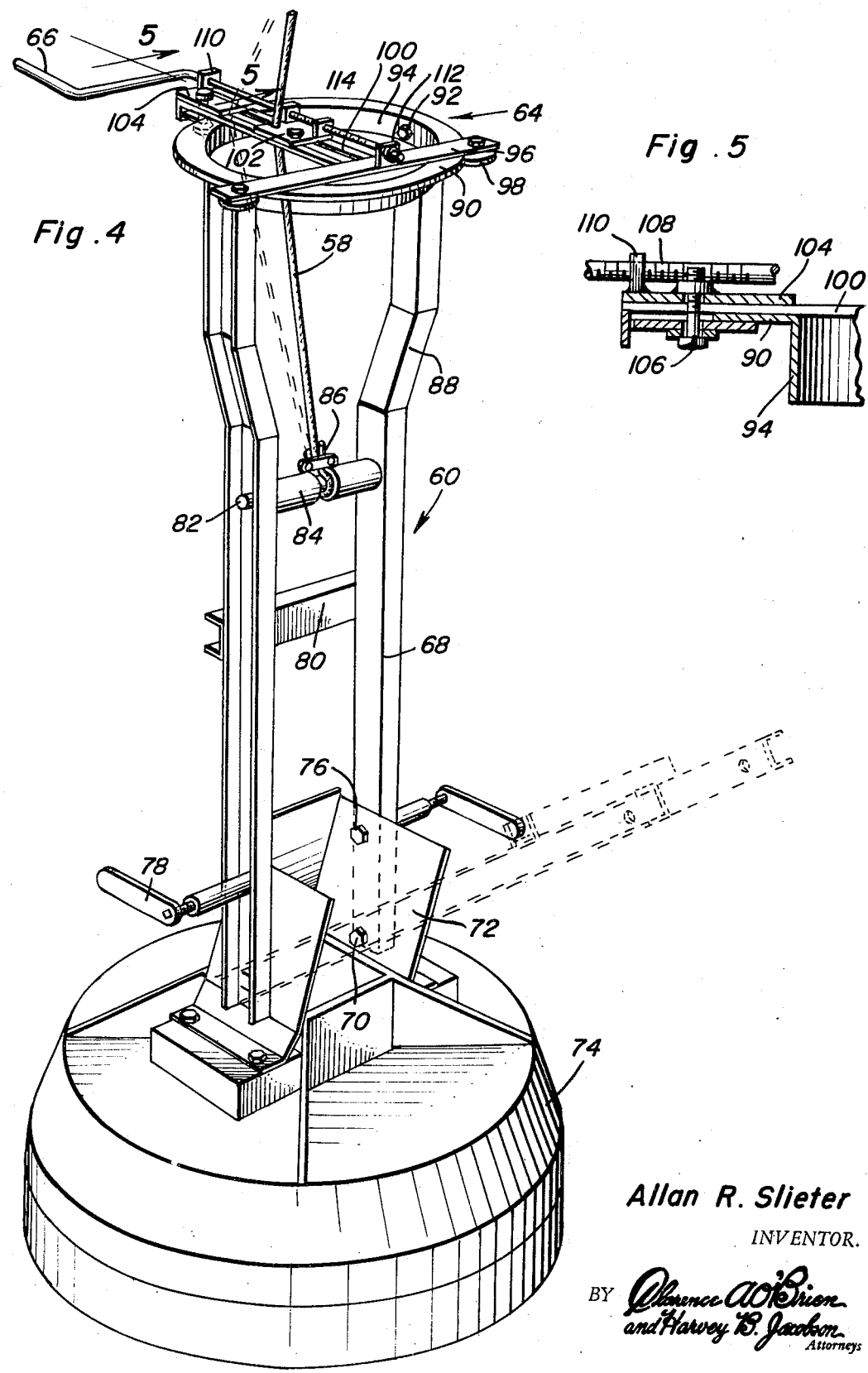

May 19, 1970  A. R. SLIETER  3,512,661
SILO UNLOADER SUSPENSION
Filed June 6, 1968  4 Sheets-Sheet 4

Allan R. Slieter
*INVENTOR.*

BY *Clarence A. O'Brien*
*and Harvey B. Jacobson*
*Attorneys*

United States Patent Office 3,512,661
Patented May 19, 1970

3,512,661
SILO UNLOADER SUSPENSION
Allan R. Slieter, Hardwick, Minn., assignor to A. R. Wood Manufacturing Company, a corporation of Minnesota
Filed June 6, 1968, Ser. No. 735,080
Int. Cl. B65g 65/36
U.S. Cl. 214—17                                  8 Claims

ABSTRACT OF THE DISCLOSURE

A silage unloader is suspended by cable within a silo for rotation about a vertical axis while removing silage. The silage removal rate of the unloader is regulated by varying the contact pressure between the unloader and the silage to compensate for non-uniform density, compaction and removal flow resistance. The amount of maximum contact pressure and the angular position of the unloader at which it occurs is selected by controlled displacement of the suspension cable from the rotational axis of the unloader utilizing a cable guide mounted on a foldable suspension frame interconnecting the unloader with the suspension cable.

---

This invention relates to the unloading of materials such as silage from storage silos and more particularly to suspended silo unloaders.

Power operated silo unloaders for removal of ensilage from a silo are well known. Generally, unloading apparatus of this type is suspended on top of the material stored within the silo and rotates about a central vertical axis as the material is conveyed radially inwardly by an auger or drag chain gathering mechanism to be discharged through either a spout or an auger-type discharge conveyor. It has been found by experience that most efficient operation of such silo unloaders occurs when a slight conical surface is maintained on the top of the silage vertically stored within the silo. However, because of varying conditions of density, compaction and removal resistance, deviations from a symmetrical conical shape on the top of the silage occurs requiring manual readjustment in order to restore the unloader to a proper operating condition. The unloader operator must therefore frequently climb to the top of the silo in order to supervise operation and make proper adjustments.

The foregoing problem in connection with the removal of silage by power operated unloaders, is particularly prevalent in colder regions because of the variation in temperature of the silage peripherally adjacent the walls of the silo referred to as a "frozen silage" condition. It will be appreciated, that the side of the silo exposed to the sun will thaw silage previously frozen a certain radial distance inwardly of the wall. Thus, there will be a variation in what is referred to as the "freezing depth" of the silage. The zone within the silo having a greater freezing depth, will offer a greater resistance to removal because of its greater density. Thus, the foregoing "frozen silage" condition is a major cause of inefficient unloader operation requiring frequent operator adjustment.

Readjustment of the silo unloaders has been necessary because they have not been able to cope with the variation in silage density, compaction and removal difficulty aforementioned. Generally, the removal rate of material associated with present silo unloaders is determined by the pressure or force of the silage gatherer on the surface of the silage and the condition of the material being removed. Since the pressure of the unloader on the silage is determined by a constant weight of the unloader, the removal rate fluctuates as the resistance to removal of the silage changes.

It is therefore an important object of the present invention to provide a suspension system for silo unloaders arranged to selectively vary the pressure exerted by the unloader on the surface of the silage in order to compensate for variations in the condition of the silage being removed.

In accordance with the present invention, a convention type of unloader is suspended from the top of the silo by means of a suspension cable and a foldable suspension frame pivotally connected intermediate its lower and upper ends to the suspension cable. A fixed rotational axis for the silo unloader is established through the suspension frame but the suspension cable may be selectively displaced by means of a cable guide from this rotational axis. The amount of displacement of the cable from the rotational axis and the angular direction in which it is displaced, is selected by means of a removal rate adjusting device. As a result thereof, the pressure with which the unloader engages the top surface of the silage will be a function of its angular position with the maximum pressure being exerted at a selected position where the "freezing depth" is greatest. Thus, as the unloader is rotated during operation, it will tend to remove silage at a greater rate at those locations where the silage is most difficult to remove because of the "frozen silage" condition.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a perspective view of the removal rate adjusting suspension frame assembly associated with the present invention.

FIG. 1 is an enlarged partial sectional view taken substantially through a plane indicated by section line 5—5 in FIG. 4.

Figure 1:
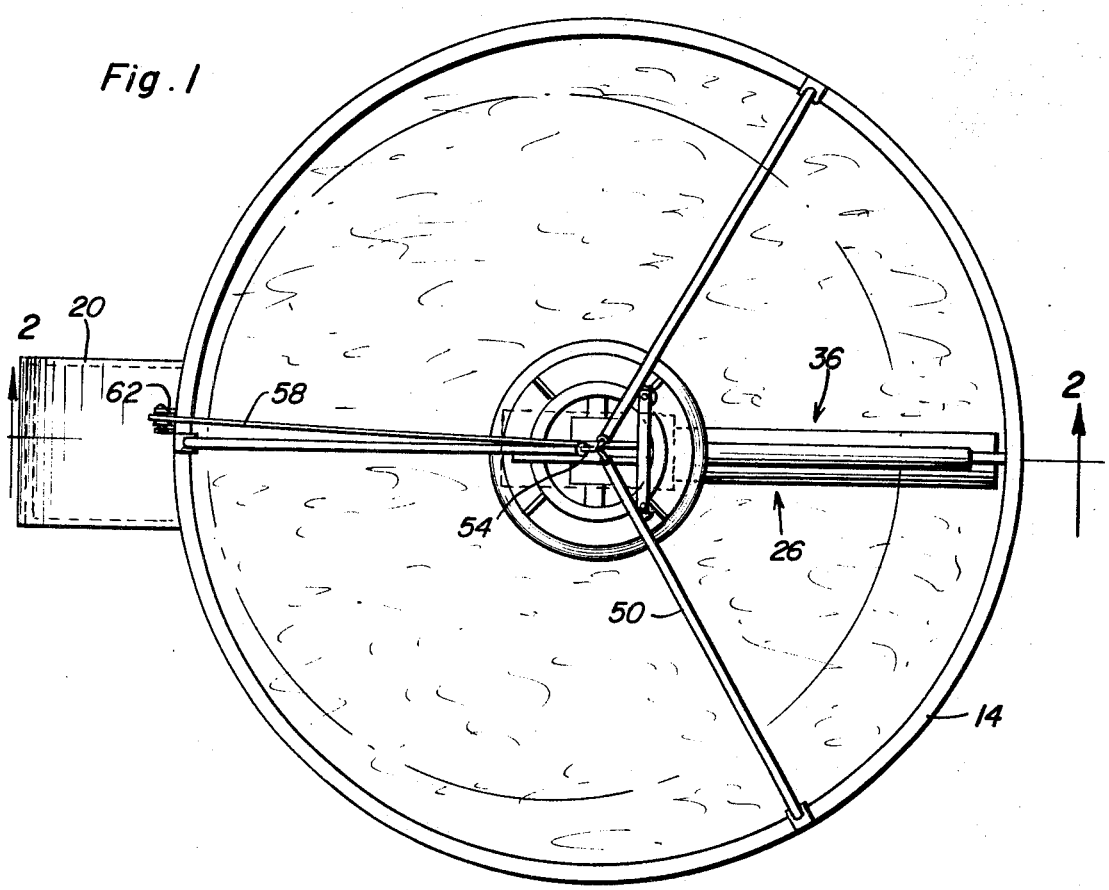
FIG. 1 is a top plan view of a silo with the dome removed showing installation of a silo unloader in accordance with the present invention.
Figure 2:
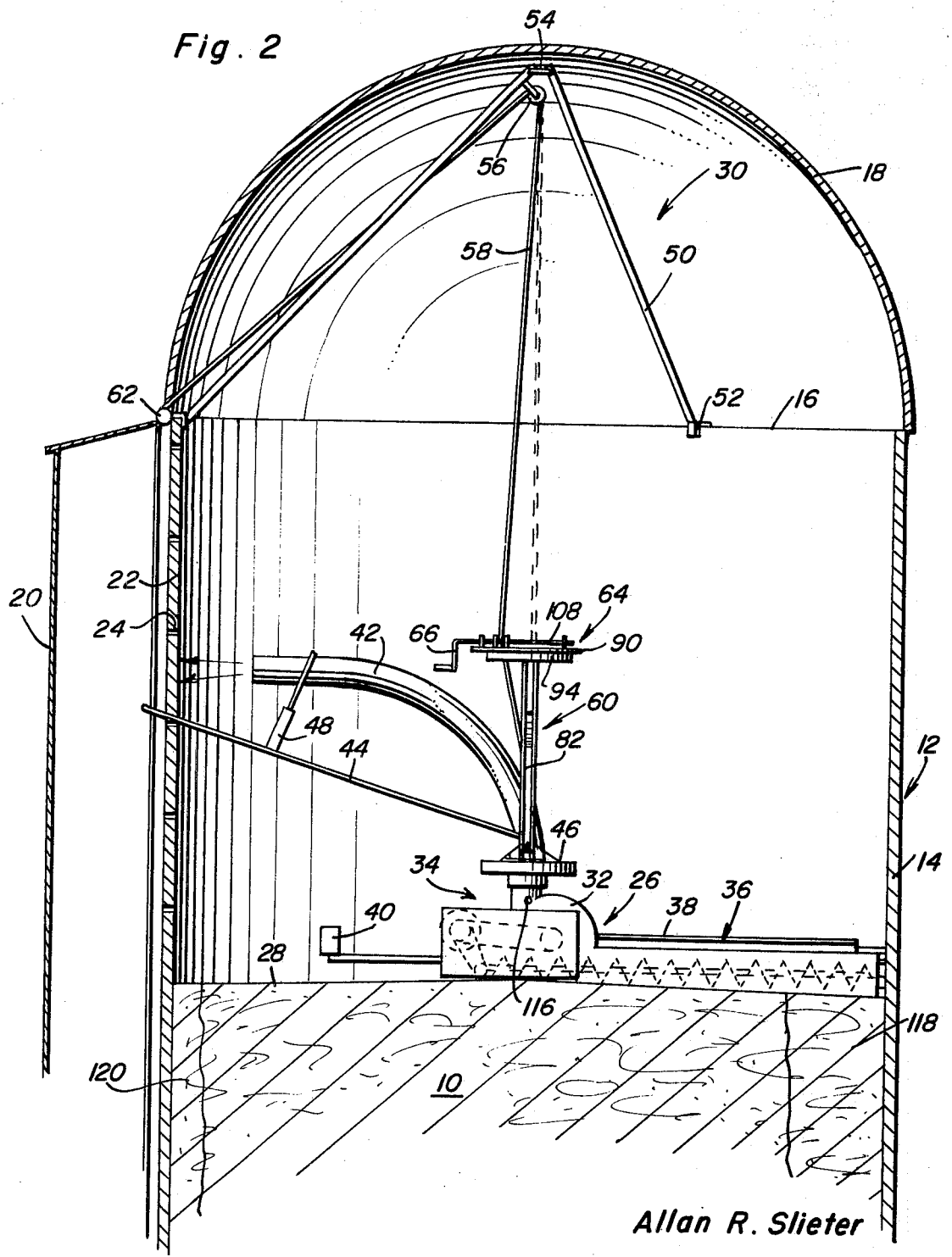
FIG. 2 is a side sectional view taken substantially through a plane indicated by section line 2—2 in FIG. 1.

Referring now to the drawings in detail, and initially to FIGS. 1 and 2, it will be noted that ensilage material which includes haylege, oatlege, grain, sorgum, etc. generally referred to by reference numeral 10 is stored within a vertical silo generally referred to by reference numeral 12. The silo includes a cylindrical wall 14 having a top edge 16. The upper end of the silo is closed by a dome 18. Mounted on one side of the silo wall 14, is a discharge chute 20 adapted to communicate with the interior of the silo through openings closed by doors 22 disposed between cross braces 24. The silage 10 is adapted to be removed by a power operated silo unloader generally referred to by reference numeral 26. The unloader is supported above the top surface 28 of the silage by means of a suspension assembly generally referred to by reference numeral 30. The suspension assembly supports the unloader for rotation about a vertical axis during operation.

The unloader 26 is of a typical type which includes a centrally located motor drive and blower housing 32 enclosing an electric motor which is operative through a drive assembly 34 to operate a radially elongated gathering means 36 having a top shield 38 disposed in protective relation thereto. The gathering means 36 is counterbalanced by a counterweight assembly 40 so that its weight is appropriately distributed to exert the requisite pressure on the top surface 28 of the silage. The gathering means may be of the auger type as illustrated or of the drag chain type causing displacement of silage radially inwardly toward the central housing 32 as the unloader is being rotated about a vertical axis. The silage upon reaching the central housing is conveyed into stationary discharge means such as spout 42 from which it is discharged through one of the openings in the cylindrical silo wall 14 communicating with the discharge chute 20. While a spout is shown in the illustrated embodiment, it will be appreciated that other types of discharge facilities may be utilized such as an auger type conveyor. In any event, the discharge means 42 is maintained stationary by a stabilizing torque arm 44 extending from the frame member 46 through which the vertical axis extends about which the unloader housing 32 and gathering means 36 rotate. The torque arm thus extends from the frame member through an opening in the silo wall and mounts a spout positioning support 48 on which the spout 42 rests in spaced relation above the torque arm in order to direct the discharge of silage radially outwardly through an opening in the silo wall into the chute 20.

The frame member 46 rotatably supports the silo unloader for rotation about the vertical axis and is in turn suspended by the suspension assembly 30 generally disposed within the dome 18. The suspension assembly includes three tripod legs 50 mounted on the top edge 16 of the silo wall through foot flanges 52 and interconnected at an apex 54 just above a pulley wheel 56 rotatably mounted on one of the tripod legs. A suspension cable 58 is entrained about the pulley wheel 56 and extends downwardly therefrom into the silo for suspension of the frame member and unloader 26 through a foldable suspension frame 60 pivotally connected to the frame member 46. The silo unloader is thereby adapted to be controllably raised or lowered by means of the suspension cable 58 which extends from the pulley 56 over the pulley 62 and down through the discharge chute 20 to an externally mounted winch (not shown).

FIG. 2 illustrates the suspension frame 60 in an erect position with the cable 58 connected thereto intermediate the lower and upper ends thereof. Further, the cable 58 is shown displaced from the vertical rotational axis of the unloader by means of a cable guide assembly 64 mounted on top of the suspension frame. A removal rate adjusting control 66 is associated with the cable guide assembly adapted to regulate the amount by which the cable is displaced from the vertical rotational axis in a selected angular direction.

Referring now to FIG. 4 in particular, it will be observed that the suspension frame may be constructed from a pair of channel frame members 68 pivotally connected at their lower ends by means of the pivot bolt assemblies 70 to a pair of chute supports 72 secured to the top of an electrical ring member 74 which rotatably supports the motor drive housing 32 and gathering means 36 for rotation about the vertical axis as aforementioned. In the erect position illustrated by solid line in FIG. 4, the frame members 68 are also fastened to the chute supports 72 in vertically spaced relation above the pivot bolts 70, by means of removable attachment bolts 76 having removable nut handles 78 connected thereto for assembly and disassembly purposes. It will be apparent therefore, that upon removal of the attachment bolts 76, the suspension frame 60 may be pivoted downwardly as shown by dotted line in FIG. 4. The frame members 68 may be interconnected by a cross frame member 80 below a removable suspension pin 82 extending between the channel frame members 68 through the sleeves 84. The cable 58 is thereby removably connected through the anchor 86 and the suspension pin 82 to the suspension frame. The frame members are provided with diverging sections 88 above the suspension pin and are accordingly more widely spaced at the upper ends for support of an appropriately dimensioned cable guide assembly 64.

The cable guide assembly includes an annular ring 90 removably connected to the upper ends of the frame members 68 by the attachment bolts 92 extending through the annular skirt 94 of the ring in 180 degree spaced relationship to each other. A support bar 96 extends chordally across the ring 90 and rotatably mounts guide wheels 98 in rolling engagement with the ring 90. A pair of parallel track bars 100 extend at right angles to the support bar 96 across the ring 90 for slidably mounting a cable guide member 102. The cable guide member 102 is thereby displaceable in a radial direction relative to the vertical rotational axis extending centrally through the suspension frame 60 in its erected position. The track bars may be locked in a selected angular position by means of a bracket 104 interconnecting the track bars at an end opposite the support bar 96. A lock bolt 106 extends through the bracket 104 and is adapted to clamp the track bars and ring 90 to the bracket 104 by means of a lock plate 106 as more clearly seen in FIG. 5. Thus, the angular position of the track bars 100 may be changed by loosening the lock bolt 106 and angularly displacing the track bars and support bar 96 to a new position. The cable guide member 102 may then be displaced to any desired radial position by means of a threaded crank rod 108 rotatably mounted by bearing brackets 110 and 112 respectively fixed to the bracket 104 and the support bar 96. The threaded crank rod also threadedly extends through internally threaded nut elements 114 which extend upwardly from the cable guide member 102. The removal rate control 66 in the form of a hand crank is connected to one end of the threaded rod 108 in order to change the radial position of the cable guide member 102 which is provided with a guide slot through which the suspension cable 58 extends.

Figure 3:
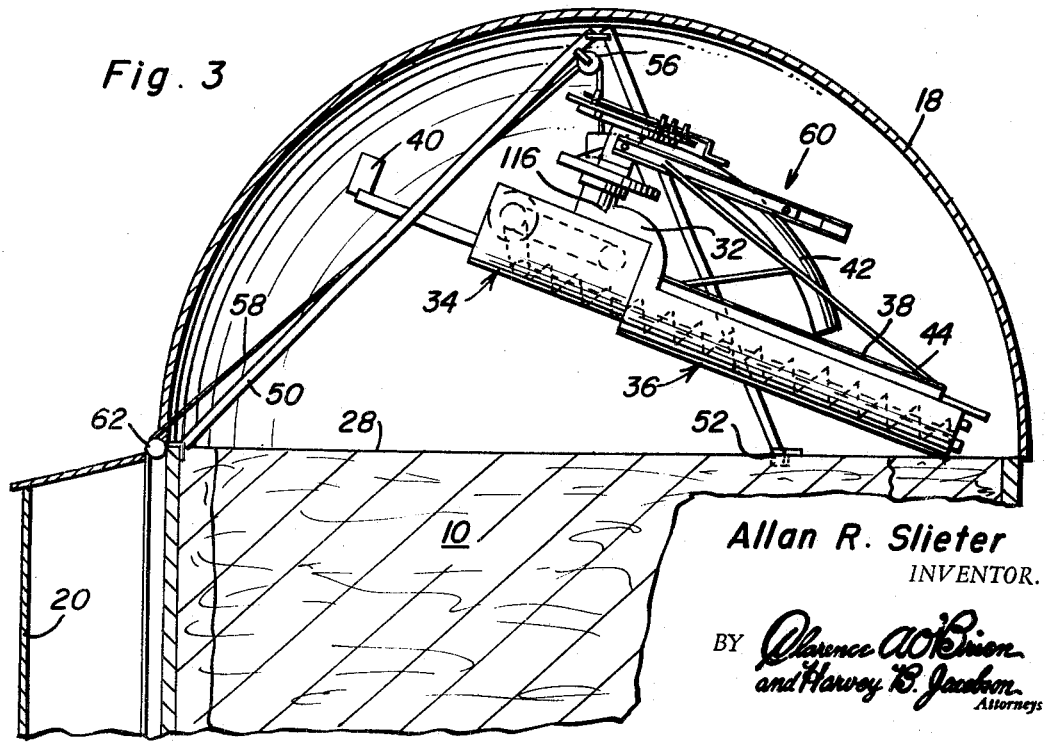
FIG. 3 is a partial side sectional view through the top part of a silo showing the silo unloader in a storage condition within the silo dome.

When the silo unloader 26 is in operation, the suspension frame assembly 60 will be in the erect position illustrated in FIG. 2. As aforementioned, the suspension frame may be folded downwardly by removal of the attachment bolts 76. The cable guide assembly 64 is also disassembled by removal of the attachment bolts 92 so that the unloader 26 may be stored within the dome 18 as shown in FIG. 3 after the discharge spout 42 is disassembled from the chute supports and the torque arm 44 folded out of the way. To raise the unloader to the storage position shown in FIG. 3, the suspension cable 58 must be disconnected from the suspension pin 82 and connected at an axis 116 on the unloader housing 32. It will therefore be apparent, that the suspension facilities for the unloader in accordance with the present invention are such as to accommodate compact storage of the unloading equipment within the dome so that the silo may be filled to a maximum height.

Figure 8:
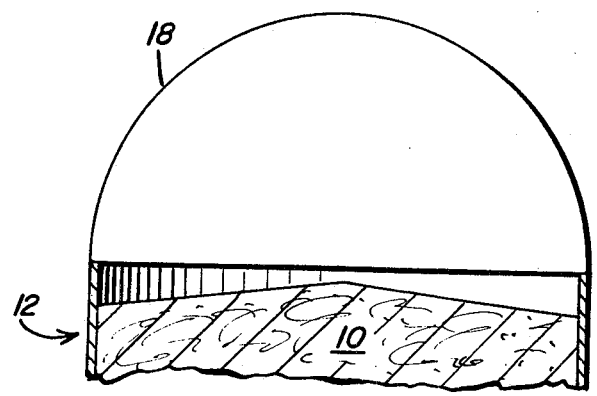
FIG. 8 is a simplified side sectional view showing the top surface of silage stored within a silo in proper condition for uniform removal.
Figure 9:
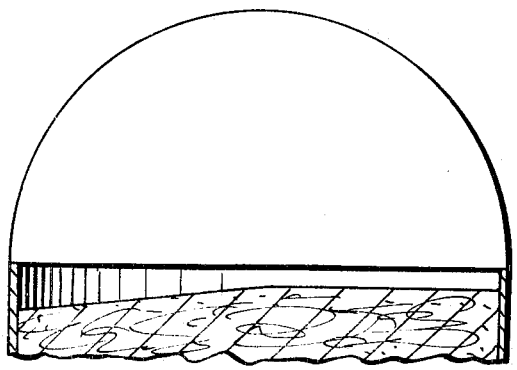
FIG. 9 is a simplified side sectional view similar to FIG. 8 but showing the top surface of the silage in an undesirable, non-symmetrical condition.

As previously indicated, when the unloader is lowered by the suspension cable through frame 60 connected by pin 82 to the cable, the pressure exerted by the unloader on the top surface 28 of the silage will depend upon its weight. Relatively uniform removal of silage is effected during rotation of the unloader if the top surface of the silage is maintained symmetrically conical as illustrated in FIG. 8. If a slanted shape is developed as shown in FIG. 9, this is indicative of inefficient operation which would get progressively worse until some readjustment is made. The uneven removal of silage as reflected by the slant surface shown in FIG. 9, results from a varying condition of the silage as aforementioned due to "frozen silage." Thus, as shown in FIG. 2, a maximum freezing depth may exist on one side of the silo denoted by reference numeral 118 opposite to or 180 degrees from a zone 120 of minimum freezing depth. In order to compensate for this varying condition usually resulting from uneven solar heating of the silage, it is desirable to regulate the removal rate of silage by varying the pressure exerted by the unloader on the top surface of the silage in a compensating manner. Thus, in accordance with the present invention, a greater pressure is exerted by the unloader on the silage while traversing the zone 118 of maximum freezing depth than would usually be effected due to the constant weight of the unloader. On the other hand, while the unloader traverses the zone of minimum freezing depth 120, the pressure of the unloader on the top surface of the silage is reduced below that of the unloader weight. The pressure exerted by the unloader on the top surface of the silage is therefore varied as a function of its angular position during rotation with the maximum and minimum values being spaced 180 degrees apart. Further, the location at which the maximum and minimum contact pressure values occur is selected in accordance with the direction from which the silo is heated by the sun. Also, the magnitude of the maximum and minimum values may be adjusted.

The foregoing adjustments and directional selection is achieved through the cable guide assembly 64. Toward this end, the lock bolt 106 in the cable guide assembly is loosened and the track bars 100 are angularly rotated to a position so that the threaded crank rod 108 is aligned in the direction of maximum freezing depth. After the track bars are locked in this selected position, the cable guide member 102 is radially displaced through the crank control 66 moving the suspension cable 58 from the vertical rotational axis shown by dotted line in FIG. 2 to the solid line position in the direction of minimum depth of freezing. Because of this displacement of the suspension cable 58 from the rotational axis, the unloader will exert a pressure on the top surface of the silage by an amount exceeding its weight at the angular position of maximum freezing depth while at the angular position of minimum freezing depth, 180 degrees away, the pressure exerted is less than the weight of the unloader. The foregoing effect is caused by the redistribution of forces and moments created by displacement of the suspension cable from the vertical rotational axis.

Figure 6:
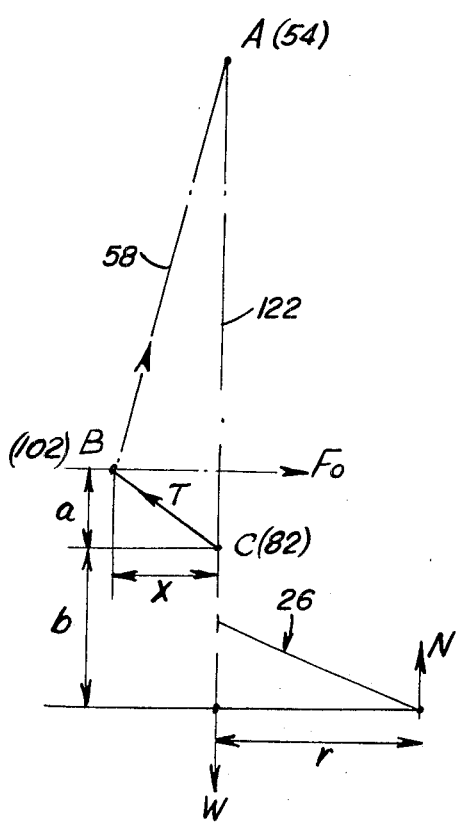
FIGS. 6 and 7 are static force diagrams illustrating the operating principles underlying the present invention.
Figure 7:
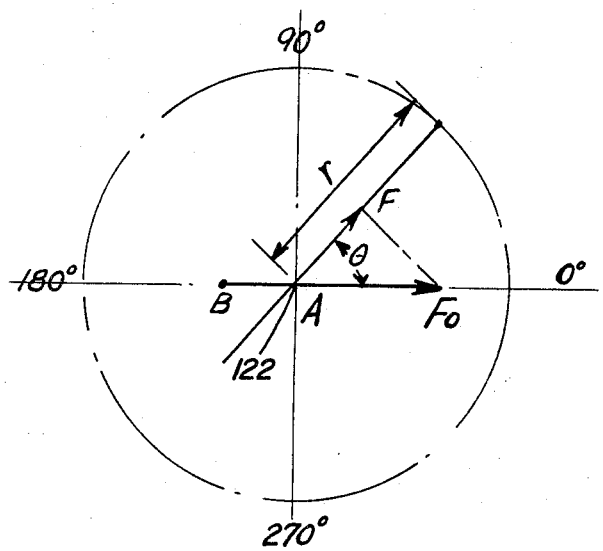

The variation in pressure exerted through the unloader on the top surface of the silage is reflected by an equal and opposite resultant force (N) exerted by the silage on the unloader located at an equivalent distance ($r$) from the vertical axis 122, as diagrammed in FIGS. 6 and 7. From such force diagrams, the variation in pressure may be derived as follows:

Assuming static conditions as depicted in FIGS. 6 and 7, for vertical balance $$T \frac{a}{\sqrt{a^2+x^2}} = W - N$$

and horizontal balance $$Fo = \frac{Tx}{\sqrt{a^2+x^2}}, \quad Fo = \frac{x}{a}(W-N)$$

and moment balance $aF \cos \theta = Nr$, $F = Fo \cos \theta$.
where
T=tension in cable
W=weight of unloader and suspension frame assumed to be directed along vertical axis 122
$x$=displacement of cable from vertical axis 122
$\theta$=angular position of unloader at any instant therefore, $x(W-N) \cos \theta = Nr$
and $$N = \frac{XW \cos \theta}{r - x \cos \theta}$$

when $\theta = 0°$, $$N = \left(\frac{xW}{r-x}\right) \uparrow$$

when $\theta = 90°, 270°, N = 0$
when $\theta = 180°$, $$N = -\left(\frac{xW}{r-x}\right) \downarrow$$

when $x = 0, N = 0$

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination with a silo, a material unloader, suspension means mounted by the silo, frame means connected to the suspension means in vertically spaced relation to the unloader for rotatable support thereof about a vertical axis, guide means mounted by the frame means for displacing the suspension means out of alignment with the vertical axis in a selected radial direction relative to the vertical axis and angular adjustment means mounted by the frame means for changing the radial direction along which the suspension means is displaced from the vertical axis.

2. In combination with a silo having a dome mounted thereon, a material unloader, suspension means mounted by the silo within the dome, and frame means connected to the suspension means in vertically spaced relation to the unloader for rotatable support thereof about a vertical axis, said frame means including a lower portion mounting said unloader for rotation about said vertical axis, a foldable section pivotally connected to the lower portion and disconnectable means connecting the suspension means to the foldable section in an unfolded position thereof, said suspension means being connectable to the unloader for storage thereof within the dome when the foldable section is in a folded position disconnected from the suspension means.

3. The combination of claim 2 wherein said suspension means includes a cable connected by the disconnectable means to the foldable section of the frame means and cable guide means mounted by the foldable section in spaced relation to the disconnectable means for adjustably displacing the cable out of alignment with said vertical axis in a selected angular direction.

4. The combination of claim 3 wherein said cable guide means comprises an annular support connected to the frame means in concentric relation to the vertical axis, a cable engaging member, angularly adjustable track means mounting said cable engaging member on the support for radial movement relative to said vertical axis in said selected direction, and means for adjustably positioning the cable engaging member on the track means in adjusted radially spaced relation to the vertical axis.

5. In combination with a silo having a dome mounted thereon, a material unloader, suspension means mounted by the silo within the dome, and frame means connected to the suspension means in vertically spaced relation to the unloader for rotatable support thereof about a vertical axis, said suspension means including a cable connected to the frame means and cable guide means mounted by the frame means for adjustably displacing the cable out of alignment with said vertical axis in a selected angular direction, said cable guide means comprising an annular support connected to the frame means in concentric relation to the vertical axis, a cable engaging member, angularly adjustable track means mounting said cable engaging member on the support for radial movement relative to said vertical axis in said selected direction, and means for adjustably positioning the cable engaging member on the track means in adjusted radially spaced relation to the vertical axis.

6. In combination with a silo storing material, a material unloader, suspension means mounted within the silo supporting the unloader for rotation about a vertical axis while in contact with the material, and removal rate control means engageable with the suspension means for regulating the rate of removal of material by the unloader as a function of the angular position of the unloader relative to said vertical axis.

7. In combination with a silo storing material, a material unloader, suspension means mounted within the silo for supporting the unloader in contact with the material, and removal rate control means engageable with the suspension means for regulating the rate of removal of material by the unloader as a function of the angular position of the unloader, said suspension means including a cable connected to the unloader on a pivot axis intersecting a vertical axis about which the unloader is rotated, said removal rate control means including a cable guide engageable with the cable in spaced relation to said pivot axis, means for angularly positioning the cable guide along a selected direction of maximum rate of removal for the unloader, and means for adjustably spacing the cable guide from said vertical axis to vary the pressure with which the unloader contacts the material.

8. In combination with a silo storing material, a material unloader, suspension means supporting the unloader within the silo for rotation about a vertical axis while removing material from the silo, means engageable with the suspension means for varying the contact pressure between the unloader and the material in response to rotation of the unloader and means for selecting the angular position of the unloader relative to the vertical axis at which maximum contact pressure is exerted on the material.

References Cited

UNITED STATES PATENTS

| | | | |
|---|---|---|---|
| 2,719,058 | 9/1955 | Van Dusen | 214—17 X |
| 3,017,044 | 1/1962 | Englemann | 214—17 |
| 3,308,973 | 3/1967 | Heitzman | 214—17 |

ROBERT G. SHERIDAN, Primary Examiner